United States Patent
Rhoads

(10) Patent No.: US 8,256,341 B2
(45) Date of Patent: Sep. 4, 2012

(54) AIR BRAKE DIAPHRAGMS

(75) Inventor: David C. Rhoads, Boonville, MO (US)

(73) Assignee: Haldex Brake Corporation, Kansas City, MO (US)

( * ) Notice: Subject to any disclaimer, the term of this patent is extended or adjusted under 35 U.S.C. 154(b) by 902 days.

(21) Appl. No.: 12/354,503

(22) Filed: Jan. 15, 2009

(65) Prior Publication Data

US 2010/0175550 A1    Jul. 15, 2010

(51) Int. Cl.
*B60T 17/08* (2006.01)
*F16J 3/02* (2006.01)

(52) U.S. Cl. ............................................. 92/99; 92/101

(58) Field of Classification Search ............... 92/99, 101
See application file for complete search history.

(56) References Cited

U.S. PATENT DOCUMENTS

| | | | |
|---|---|---|---|
| 3,435,734 A | 4/1969 | Bushway et al. | |
| 3,872,777 A * | 3/1975 | Mastis | 92/101 |
| 3,911,796 A * | 10/1975 | Hull et al. | 92/101 |
| 3,926,094 A | 12/1975 | Kurichh et al. | |
| 4,086,036 A | 4/1978 | Hagen et al. | |
| 4,850,263 A | 7/1989 | Rumsey et al. | |
| 4,860,640 A | 8/1989 | Ware | |
| 5,836,233 A | 11/1998 | Rumsey | |
| 6,212,996 B1 | 4/2001 | Savel et al. | |
| 6,349,629 B1 * | 2/2002 | Plantan et al. | 92/99 |
| 6,647,860 B2 | 11/2003 | Savel et al. | |

FOREIGN PATENT DOCUMENTS

GB        2088525 A  *   6/1982

\* cited by examiner

*Primary Examiner* — Thomas E Lazo
(74) *Attorney, Agent, or Firm* — St. Onge Steward Johnston & Reens LLC

(57) ABSTRACT

An air-operated diaphragm brake, more particularly a brake actuator assembly containing a diaphragm with a rib or ring design for centering and maintaining the location of a piston or push plate and for reducing debris build up in the brake actuator assembly. The diaphragm includes a projecting rim for engaging a housing containing a piston, a bottom wall having an interior surface for engaging the piston, a sidewall connecting the projecting rim with the bottom wall; and a plurality of ribs or a ring disposed on the interior surface of the bottom wall. The ribs or ring structure extends in a direction away from the intersection between the sidewall and the bottom wall, toward the center of the interior surface, and revolving around the center point of the interior surface.

13 Claims, 4 Drawing Sheets

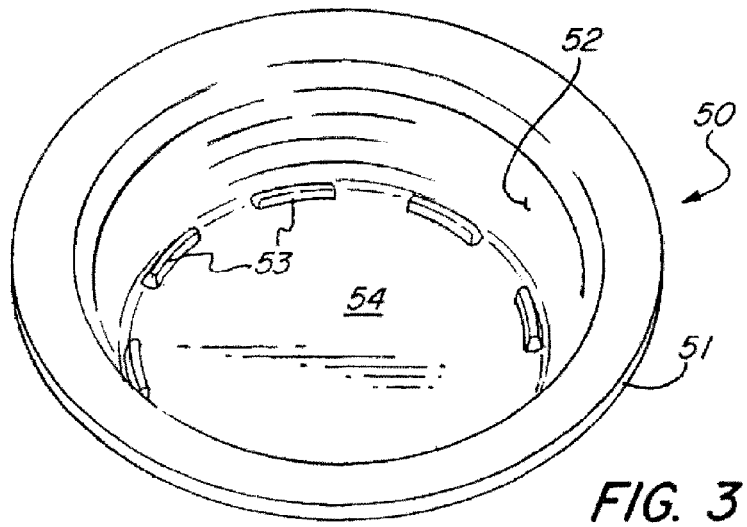
FIG. 3
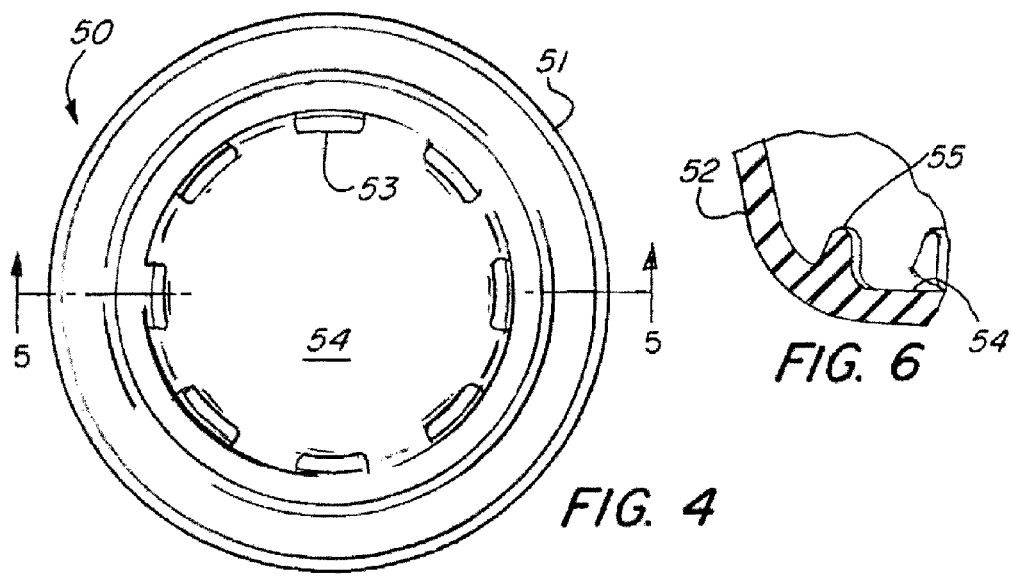
FIG. 4
FIG. 6
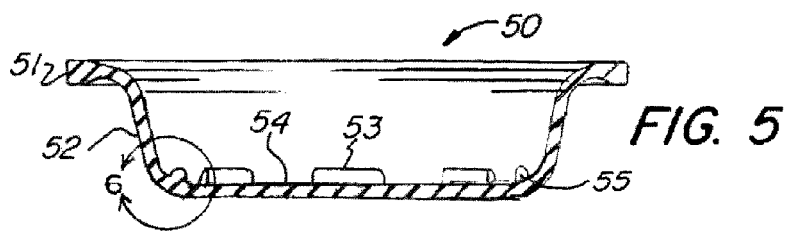
FIG. 5

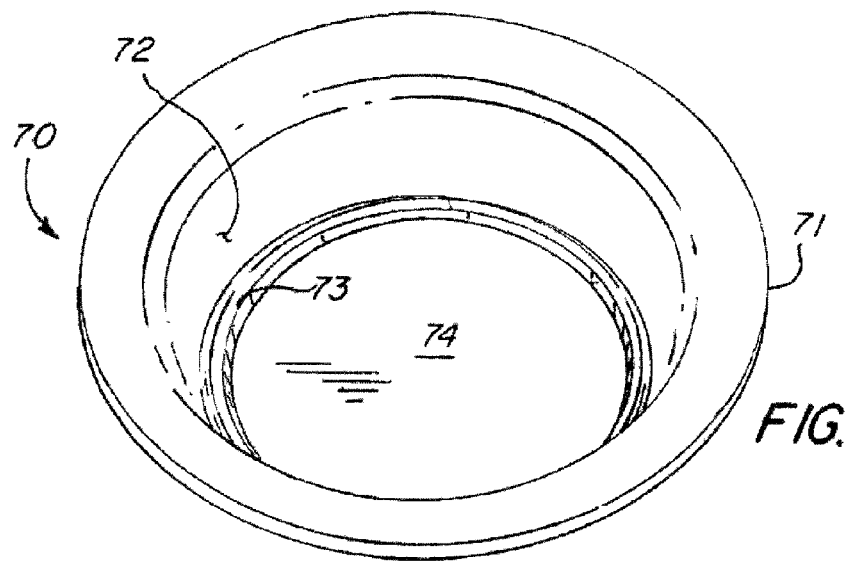
FIG. 7
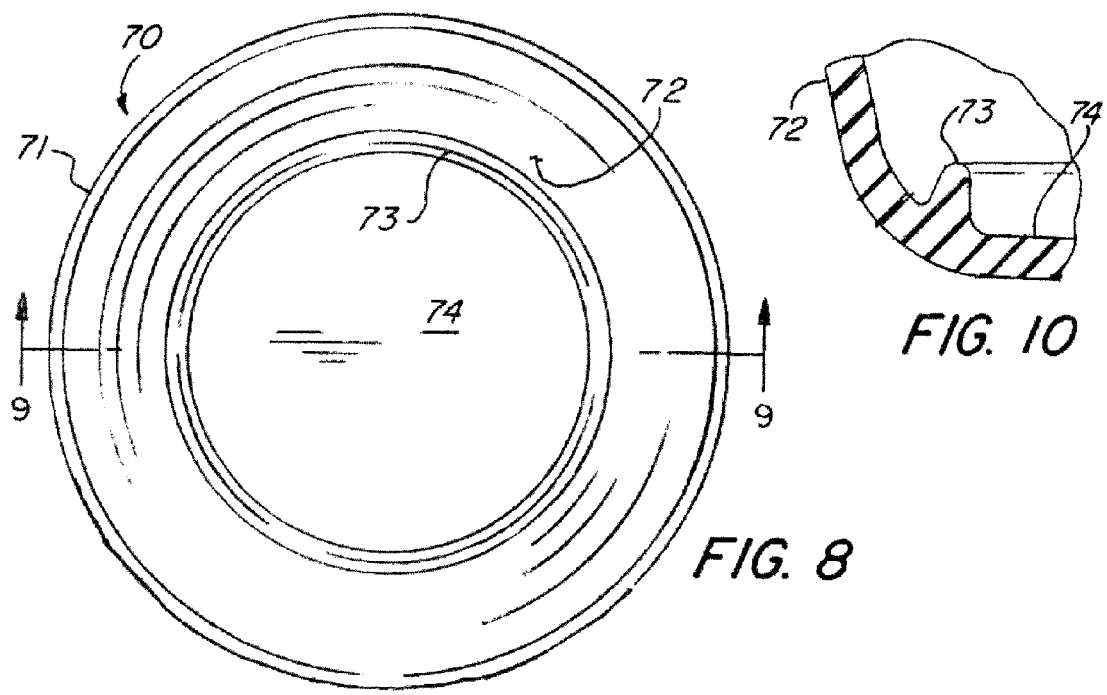
FIG. 10
FIG. 8
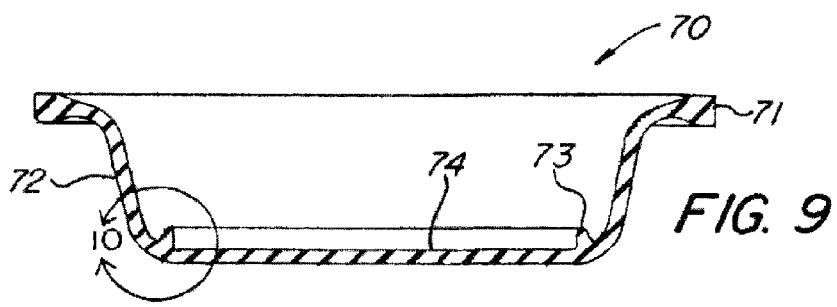
FIG. 9

AIR BRAKE DIAPHRAGMS

FIELD OF THE INVENTION

The invention relates to air-operated diaphragm brakes for vehicles, and more particularly to a brake actuator assembly containing a diaphragm with either a rib or ring design for centering and maintaining the location of a piston or push plate and also for reducing debris build up in the brake actuator assembly.

BACKGROUND OF THE INVENTION

Service brake diaphragms are used in brake actuators operated by fluid pressure, such as actuators found in air braking systems of trucks, trailers, trains, and other heavy-duty vehicles. These air brake systems typically are actuated by means of an actuator assembly operated by the selective application of compressed air.

In a typical service brake actuator, the air-operated brake housing is divided into a pressure chamber and a pushrod chamber. The pressure chamber is fluidly connected to a source of pressurized air and the pushrod chamber mounts a piston or pushrod, which is coupled to the brake assembly, whereby the introduction and exhaustion of pressurized air into the pressurized chamber reciprocates the pushrod into and out of the housing to apply and release the operating brakes.

One known problem in association with service brake actuators of this design is that the piston of an actuator is known to slip, and to move. During wet weather, water mixed with road oil and dirt migrates between the piston and the diaphragm, and acts as a lubricant. The piston can slide radially out of center position, which can restrict the actuator stroke and/or reduce the force output of the actuator. This presents a problem as the service brake will not work as efficiently as under normal conditions, which can lead to longer stopping distances, and eventual malfunction of the service brake. Prior art designs have done little to solve this problem except to straighten the wall of the diaphragm and add grooves. This effect changes the force output curve for the actuator. Optimally, the force output curve should be as flat as possible for maximum stroke actuation. However, straightening the wall makes the force output curve sideways S shaped. Prior art designs have considered the removal of debris as only a secondary concern. These designs are limited as they do not efficiently remove excess debris from the interior surface of the diaphragm as well as also correct misalignment of the piston.

Typically, diaphragms for service brake actuators are made from two layers of rubber sandwiching a layer of fabric. Diaphragms in service brake actuators are generally supported at their periphery between the two housings of the actuator. Upon introduction of a fluid pressure on one side of the diaphragm, the diaphragm moves a push plate or piston to actuate a braking mechanism. The diaphragm is returned to its normal position when compressed air is released, a small return spring returning the pushrod and diaphragm into the normal position.

Diaphragms for brake actuators generally are cup shaped with a bottom wall or base merging into a conical sidewall. The conical sidewall terminates at a rim which is clamped between an upper and lower portion of a housing unit. A force is exerted by the diaphragm upon a piston or push plate, and the diaphragm is typically in direct contact with the piston. Problems occur when material ends up between the piston and the diaphragm, limiting the direct touching between the diaphragm and piston, and causing the piston to slide radially out of the center position. This can restrict the actuator stroke and/or reduce the force output of the actuator.

It is thus desirable to develop a diaphragm for a brake actuator that that helps remove waste material from the diaphragm and limits the radial movement of the piston from the center position. It is also desirable to help positively locate the piston in the diaphragm during assembly, as shown by the embodiments of the present invention.

SUMMARY OF THE INVENTION

The invention is directed to a diaphragm for use in a brake actuator. The design allows for a durable diaphragm that helps remove material that becomes trapped between a piston and a diaphragm in a brake actuator. The design limits the radial movement of the piston from the center position, and helps to positively locate a piston in the diaphragm during assembly.

A brake diaphragm in accordance with the present invention has a projecting rim for engaging a housing containing a piston, a bottom wall having an interior surface for engaging the piston, and a sidewall connecting the projecting rim with the bottom wall. A plurality of ribs is disposed on the interior surface of the bottom wall, whereby each of the ribs extends in a direction away from the intersection between the sidewall and the bottom wall, toward the radial center of the interior surface, revolving around the radial center of the interior surface.

The plurality of ribs can be rectangular shaped or can have various other shapes including, but not limited to, trapezoids, triangles, semicircles, and others. A plurality of ribs is used to hold the piston against the ribs, which are connected to the bottom wall of the diaphragm. The ribs form a space between the diaphragm and the piston, and allow gravity to pull debris out from between the piston and the diagram, removing material and waste from the piston and the diaphragm.

The ribs restrain the lateral movement of the piston and help locate the piston in the diaphragm during assembly. The actuator is set with the centerline axis horizontal or within 10 degrees of horizontal.

The ribs are part of the molded material that makes up the diaphragm. The diaphragm including the ribs is typically made from flexible rubber. However, the diaphragm can also be made from other materials including fabrics that are durable and stretch, and can resist the wear and tear of the force applied by the compressed air and piston.

The thickness of the diaphragm of the present invention is not in-line with a thin-walled brake diaphragm. Rather, the invention conforms to standard size diaphragms used in service brake actuators. The structure of the service brake actuators and diaphragms of the present invention meet or exceed all of the SAE (Society of Automotive Engineers) standards for diaphragms of this type.

A preferred embodiment of the invention further involves the ribs extending in a perpendicular direction away from the intersection of the sidewall and the bottom wall, toward the radial center point of the interior surface, revolving around the radial center of the interior surface.

According to one embodiment of the invention, a brake diaphragm in accordance with the present invention has a projecting rim for engaging a housing containing a piston, a bottom wall having an interior surface for engaging the piston, and a sidewall connecting the projecting rim with the bottom wall. A ring is disposed on the interior surface of the bottom wall, extending in a direction away from the intersection between the sidewall and the bottom wall, toward the center of the interior surface, revolving around the radial center of the interior surface.

This ring prevents debris buildup along the diaphragm and controls the lateral movement of the piston during actuation of said actuator. The ring also holds the piston against the ring, forming a space between the diaphragm and the piston.

The ring allows for a space to be formed between the diaphragm and the piston and creates an air pocket, allowing trapped air and debris to be forced out during actuation of the brake actuator. Specifically, when actuation occurs, the piston and/or piston plate is forced to tilt due to the actuation, creating the air pocket. During actuation, the diaphragm pushes flush to the plate and expels and forces out the air and other contaminants, much like a burp. Foreign material is expelled with the air through multiple cycles of actuation.

A preferred embodiment of the invention further involves the ring extending in a direction away from the intersection between the sidewall and the bottom wall that is perpendicular to the intersection.

Another embodiment of the invention involves a method for controlling the lateral movement of a piston during actuation of an actuator comprising the steps of providing a diaphragm containing a rim, sidewall, and bottom wall having an interior surface; displacing a plurality of ribs on the interior surface of the bottom wall of diaphragm; engaging the piston with ribs; and actuating said actuator, whereby during actuation of said actuator, said ribs serve to hold the piston, and form a space between said diaphragm and said piston.

This method also involves the step of pulling debris from the space formed between the diaphragm and said piston. The method further involves the step of controlling the lateral movement of a piston during actuation.

Another embodiment of the invention involves a method for controlling lateral movement of a piston during actuation of an actuator comprising the steps of providing a diaphragm containing a rim, sidewall, and bottom wall having an interior surface; displacing a ring on said interior surface of said bottom wall of diaphragm; engaging the piston with the ring; and actuating said actuator, whereby during actuation of said actuator, the ring serves to hold the piston, forming a space between the diaphragm and the piston.

The method also involves the step of forming an air pocket between the piston and diaphragm, whereby the air pocket is forced out during the actuation of said actuator. The air pocket contains additional waste and debris which is also forced out during actuation of said actuator.

BRIEF DESCRIPTION OF THE DRAWINGS

FIG. 3 illustrates an isometric view of the present invention brake diaphragm with ribs on the interior surface of the bottom wall of the diaphragm;

FIG. 4 illustrates a top detailed view of the diaphragm of FIG. 3;

FIG. 5 shows a cross-section view of the diaphragm, taken along line 5-5 of FIG. 4, in accordance with the present invention;

FIG. 6 is a close up detailed view of the rib structure of FIG. 5;

FIG. 7 illustrates an isometric view of the brake diaphragm with a ring on the interior surface of the bottom wall of the diaphragm;

FIG. 8 illustrates a top detailed view of the diaphragm of FIG. 7;

FIG. 9 shows a cross-section view of the diaphragm, taken along line 9-9 of FIG. 8, in accordance with the present invention;

FIG. 10 is a close up detailed view of the ring structure of FIG. 9;

DETAILED DESCRIPTION OF THE INVENTION

Figure 1:
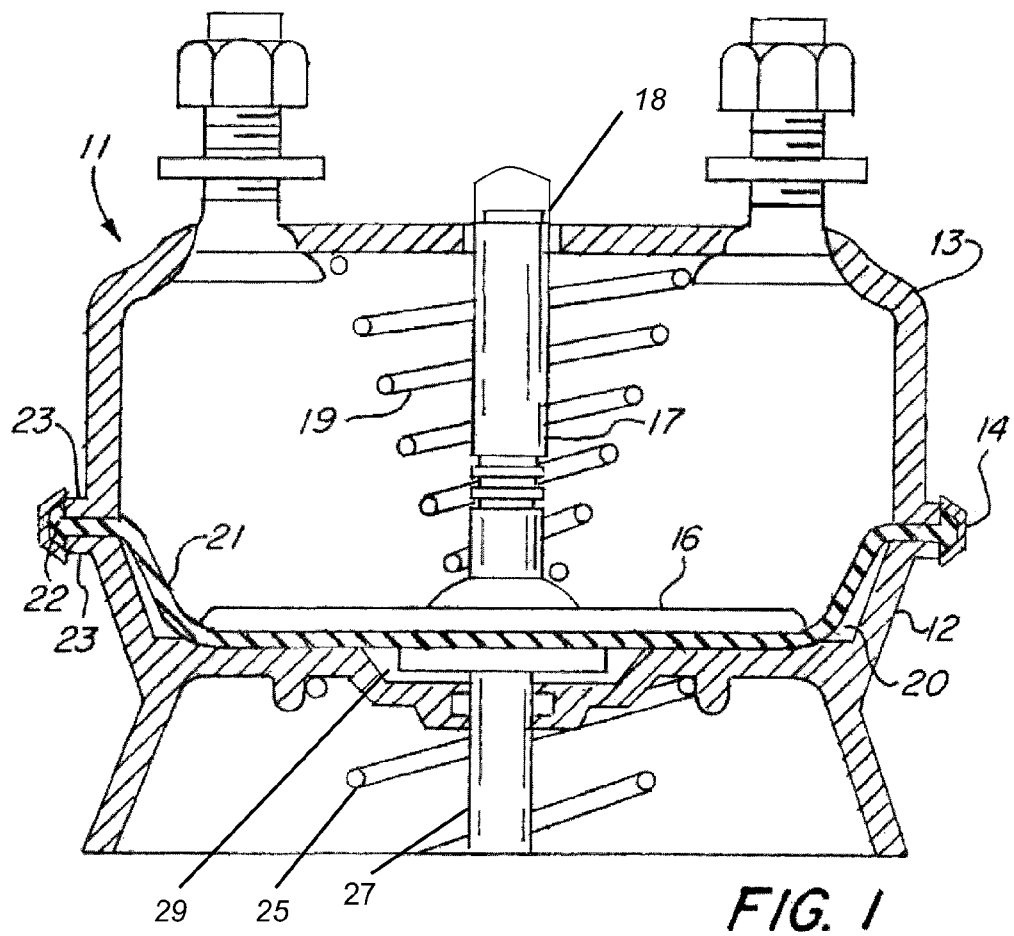
FIG. 1 is a sectional view of a prior art brake actuator.

FIG. 1 illustrates a conventional brake actuator 11 of the type used on trucks, trains, and other heavy-duty vehicles. Actuator 11 comprises a circular chamber consisting of separate housing parts 12 and 13 held together by a clamp band 14 attached to flanges 23. A moveable piston 16, attached to piston rod 17, is disposed within the chamber and extends through an opening 18 in housing part 13. The external end of piston rod 17 connects to a braking mechanism (not shown). Spring 19 surround piston rod 17 and forces this rod and piston 16 toward diaphragm 21 and housing part 12. Diaphragm 21 is cup shaped with a flanged portion 22 at its periphery. This flanged portion is clamped between flanges 23 of housing parts 12 and 13 to seal the spaces within housing parts 12 and 13 on opposite sides of the diaphragm.

In operation, compressed air enters space 20 beneath diaphragm 21 through ports (not shown). This compressed air causes diaphragm 21, piston 16, and piston rod 17 to move upwardly to actuate the braking mechanism. Diaphragm 21 move to a position which is the inverse of that shown in FIG. 1 (the position assumed by the diaphragm when no force is applied). When the compressed air exist space 20, spring 19 returns diaphragm 21, piston 16 and piston rod 17 to the position shown in FIG. 1. Piston 29, piston rod 27 and spring 25 are part of an emergency braking system (in the event of the loss of air pressure) and a parking brake system.

Figure 2:
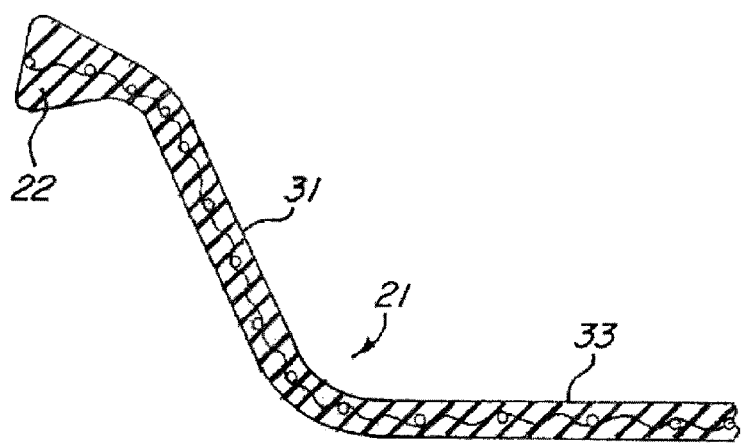
FIG. 2 is a sectional view of a prior art brake diaphragm for use in a brake actuator such as that shown in FIG. 1.

An enlarged cross-sectional view of brake diaphragm 21 is shown in FIG. 2. Diaphragm 21 comprises a bottom wall 33 which engages piston 16. This bottom planar wall merges into sidewall 31 which connects rim 22 with bottom wall 33.

A brake diaphragm 50 in accordance with the present invention is shown in FIGS. 3-13. Like prior art diaphragm 21, brake diaphragm 50 is generally cup shaped. FIG. 3 illustrates an isometric view of the brake diaphragm 50 with ribs 53 located on the interior surface of the bottom wall 54 of the diaphragm 50. Also shown in FIG. 3 is the sidewall 52, which connects rim 51 to the bottom wall 54. The design allows for a durable diaphragm that helps remove material that becomes trapped between a piston and a diaphragm in a brake actuator. The design limits the radial movement of the piston from the center position, and helps to positively locate a piston in the diaphragm during assembly.

FIG. 4 is a top view of the brake diaphragm 50 shown in FIG. 3. Here, plurality of ribs 53 are shown arranged in the circular manner on the bottom wall 54. The rim 51 is also shown as well as the circular structure of diaphragm 50.

FIG. 5 is a vertical cross section view of the brake diaphragm taken along line 5-5 of FIG. 4. Here, one can clearly see ribs 53 located on the interior surface of the bottom wall 54 of the diaphragm 50. Also illustrated is sidewall 52, which connects rim 51 to the bottom wall 54. A cross section of the ribs is shown as rib 55 extending in a direction away from the intersection between the sidewall 52 and the bottom wall 54, toward the center of the interior surface. In a preferred embodiment, the rib 55 extends in a perpendicular direction away from intersection between the sidewall 52 and the bottom wall 54.

FIG. 6 is an up close view of rib 55 shown in FIG. 5. Here, one can see how the rib is connected to the bottom wall of the diaphragm, whereby the rib 55 is a protrusion extending from the bottom wall 54.

In an alternative embodiment of the invention, FIG. 7 illustrates an isometric view of the brake diaphragm 70 with the ring 73 located on the interior surface of the bottom wall 74 of the diaphragm 70. Also shown in FIG. 7 is the sidewall 72, which connects rim 71 to the bottom wall 74. The ring serves to hold a piston and a diaphragm in a brake actuator. The design limits the radial movement of the piston from the center position, and helps to positively locate a piston in the diaphragm during assembly.

FIG. 8 is a top detailed view of the brake diaphragm 70 shown in FIG. 7. Here, ring 73 is shown as well as rim 71. The bottom wall 74 illustrated as well as the circular structure of diaphragm 70.

FIG. 9 shows a vertical cross section view of the brake diaphragm taken along line 9-9 of FIG. 8. Here, one can clearly see ring 73 located on the interior surface of the bottom wall 74 of the diaphragm 70. Also illustrated is sidewall 72, which connects rim 71 to the bottom wall 74. Ring 73 is shown extending in a direction away from the intersection between the sidewall 72 and the bottom wall 74, toward the center of the interior surface. Ring 73 is shown.

In a preferred embodiment, the ring 73 extends in a perpendicular direction away from intersection between the sidewall 72 and the bottom wall 74. This provides for support of a piston and creates a space where debris and waste can be expelled from.

FIG. 10 is an up close view of ring 73 shown in FIG. 9. Here, one can see how the ring 73 is connected to the bottom wall of the diaphragm, whereby the ring 73 is a protrusion extending from the bottom wall 74.

Figure 11:
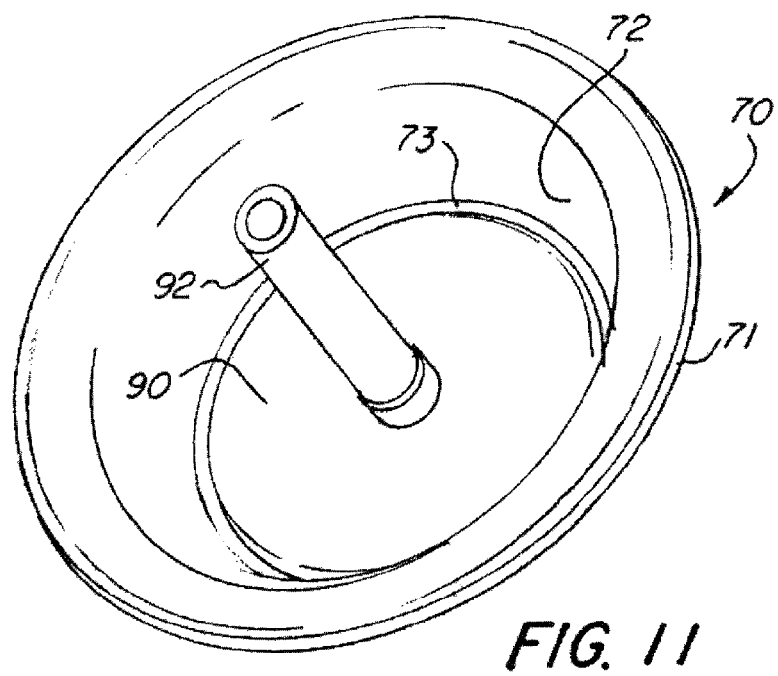
FIG. 11 is an isometric view of the diaphragm with a ring on the interior surface of the bottom wall of the diaphragm and also with a piston mounted onto the diaphragm.

FIG. 11 is an isometric view of the diaphragm 70 with piston 90 attached. Here is shown how the diaphragm 70 supports the piston 90. Further, ring 73 is shown connected to sidewall 72 and sidewall 72 is shown connect to the rim 71.

Figure 12:
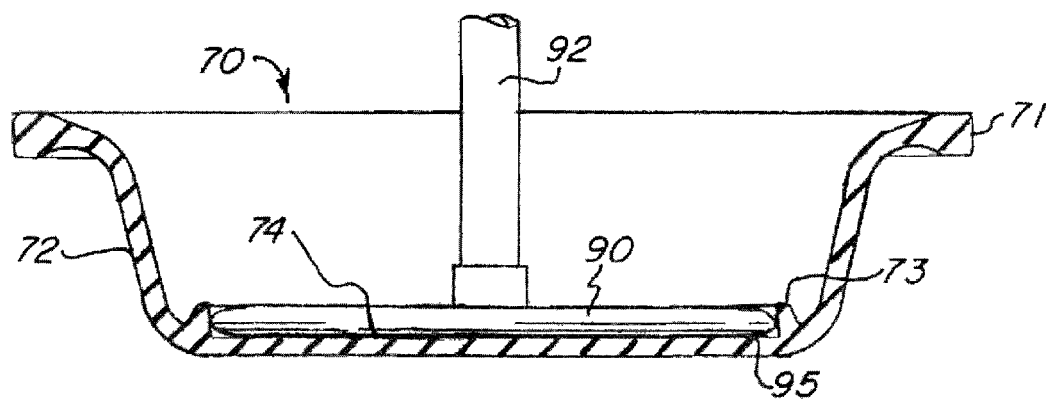
FIG. 12 shows a cross-section view of the diaphragm with a ring and piston, taken in accordance with FIG. 11, and accordance with the present invention.

FIG. 12 shows a cross-section view of the brake diaphragm in FIG. 11. One can see the piston being restrained by the ring 73. One can also see the space 95, whereby debris and waste material is forced out during the actuation process through the space 95.

During actuation, piston 90 tilts and creates an air pocket in space 95. When the unit is actuated, the diaphragm pushes flush to the plate and expels the air and forces out the other contaminants, much like a burp. Foreign material is expelled with the air through multiple cycles of actuation.

Figure 13:
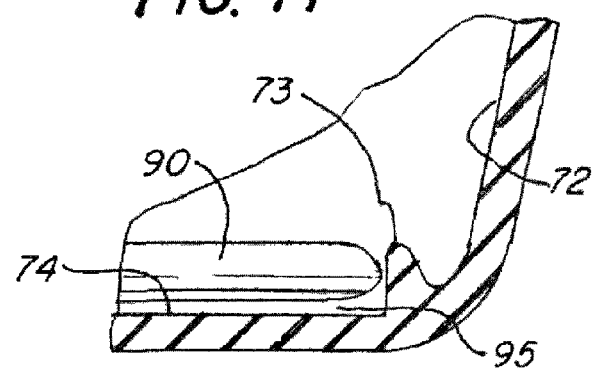
FIG. 13 shows a close up detailed view of the ring structure with piston.

FIG. 13 shows a close up view of the ring structure shown in FIG. 12. This figure demonstrates and shows how the piston is held by the ring structure, forming a space 95 that allows waste and other debris to be expelled from the diaphragm. The close up view also more clearly illustrates how the piston 90 is restrained by the ring 73.

While the invention has been specifically described in connection with certain specific embodiments thereof, it is to be understood that this is by way of illustration and not of limitation and that various changes and modifications in form and details can be made thereto, and the scope of the appended claims should be construed as broadly as the prior art will permit.

What is claimed is:

1. A diaphragm for use in a brake actuator, said diaphragm comprising:
    a projecting rim for engaging a housing containing a piston,
    a bottom wall having an interior surface for engaging the piston,
    a sidewall connecting the projecting rim with the bottom wall; and
    a plurality of ribs disposed on the interior surface of the bottom wall, whereby each of the ribs extends in a direction away from the intersection between the sidewall and the bottom wall, toward the center of the interior surface, the plurality of ribs holding the piston against the ribs and forming a space between the diaphragm and the piston, so that the ribs prevent debris buildup along the diaphragm, as the space formed between the diaphragm and the piston allows debris to fall out from between the piston and the diaphragm.

2. The diaphragm of claim 1, wherein the plurality of ribs are evenly spaced.

3. The diaphragm of claim 1, wherein the ribs restrain the lateral movement of the piston.

4. The diaphragm of claim 3, wherein the plurality of ribs each contains a shoulder that holds said piston.

5. The diaphragm of claim 4, wherein said shoulders extend radially towards the center of the interior surface of the diaphragm.

6. The diaphragm of claim 1, wherein the gap relative to rib length is large enough to expel debris not longer than the circumferential length of the ribs.

7. The diaphragm of claim 1, where the ribs are circumferentially extending to match the outer diameter of the piston.

8. A diaphragm for use in a brake actuator, said diaphragm comprising:
    a projecting rim for engaging a housing containing a piston,
    a bottom wall having an interior surface for engaging the piston,
    a sidewall connecting the projecting rim with the bottom wall; and
    a ring disposed on said interior surface of said bottom planar wall, extending in a direction away from the intersection between the sidewall and the bottom wall, toward the center of the interior surface,
    wherein the ring holds the piston against the ring, forming a space between the diaphragm and the piston, the space formed between the diaphragm and the ring creates an air pocket, allowing trapped air and debris to be forced out during actuation of the brake actuator.

9. The diaphragm of claim 8, wherein the ring prevents debris buildup along the diaphragm and restrains the lateral movement of the piston during actuation of said actuator.

10. A method for controlling the lateral movement of a piston during actuation of an actuator comprising the steps of:
    providing a diaphragm containing a rim, sidewall, and bottom wall having an interior surface;
    displacing a plurality of ribs on the interior surface of the bottom planar wall of diaphragm,
    engaging the piston with the ribs, whereby during actuation of said actuator, the ribs hold the piston, and form a space between the diaphragm and said piston, wherein during actuation of said actuator, debris is pulled out from the space formed between the diaphragm and the piston.

11. The method of claim 10, further comprising the step of controlling the lateral movement of the piston during actuation.

12. A method for controlling the lateral movement of a piston during actuation of an actuator comprising the steps of:
providing a diaphragm containing a rim, sidewall, and bottom wall having an interior surface;
displacing a ring on said interior surface of said bottom planar wall of diaphragm,
engaging the piston with the ring, whereby during actuation of said actuator, the ring serves to hold the piston, and forms a space between the diaphragm and the piston,
wherein during actuation of said actuator, an air pocket forms between the piston and diaphragm, whereby said air pocket is forced out during actuation of said actuator, and debris is forced out with said air pocket.

13. The method of claim 12, further comprising the step of controlling the lateral movement of the piston during actuation.

* * * * *